Figure 1:
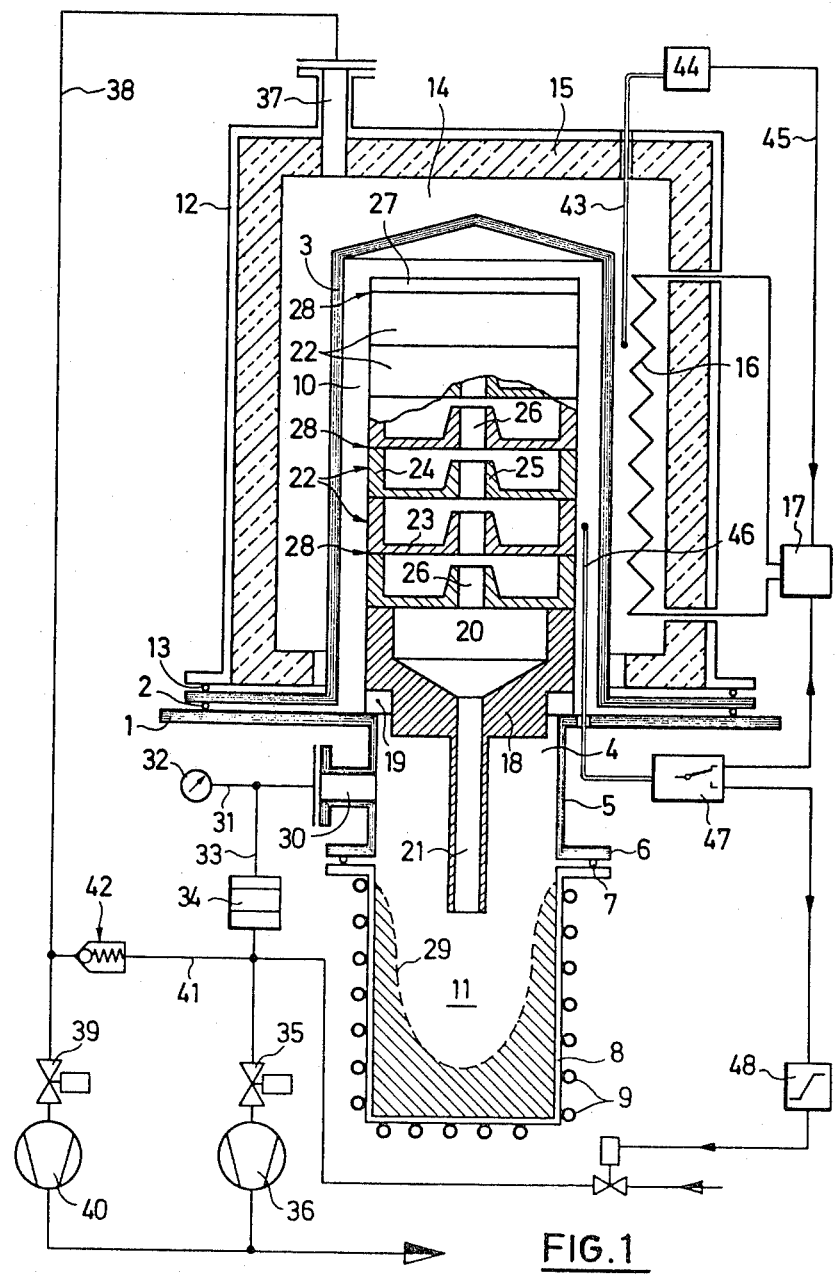

United States Patent [19]

Wanetzky et al.

[11] 4,407,488

[45] Oct. 4, 1983

[54] DISTILLATION AND SUBLIMATION APPARATUS COMPRISING A CONDENSER

[75] Inventors: Erwin Wanetzky, Gross-Krotzenburg; Franz Hugo, Aschaffenburg; Fernand Kuhlmann, Luxemburger Staatsbürger, all of Fed. Rep. of Germany

[73] Assignee: Leybold-Heraeus GmbH, Cologne, Fed. Rep. of Germany

[21] Appl. No.: 437,844

[22] Filed: Oct. 29, 1982

[30] Foreign Application Priority Data

Nov. 7, 1981 [DE] Fed. Rep. of Germany ....... 3144285

[51] Int. Cl.³ ............................................... F27D 7/06
[52] U.S. Cl. ................................ 266/148; 202/185 R; 202/188; 266/149; 75/14; 75/88
[58] Field of Search ............................... 266/148–154; 202/185 R, 188; 75/14, 88, 67 R

[56] References Cited

U.S. PATENT DOCUMENTS 1,994,357 3/1935 Ginder et al. ..................... 266/151
4,045,006 8/1977 Cherednichenko et al. ....... 266/149

FOREIGN PATENT DOCUMENTS 1159918 7/1969 United Kingdom ............... 266/149

*Primary Examiner*—M. J. Andrews
*Attorney, Agent, or Firm*—Max Fogiel

[57] ABSTRACT

The invention relates to a distillation and sublimation apparatus having a receiving vessel and a number of containers for the starting product. Each container has a bottom, an outer wall and an inner wall with a vapor duct, and the containers are stacked one upon the other in such manner that the vapor ducts are arranged in series. An annular space is present outside the stack of containers. The apparatus comprises a condenser into which the vapor duct of the bottom container discharges.

For the purpose of solving the problem of preventing condensation of vapor on the receiving vessel, it is proposed, in accordance with the invention, that capillary gaps (28), which are open towards the receiving vessel (3), be present between the containers (26). Furthermore, the condenser (8) communicates with the annular space (10) by way of at least one return-flow orifice (19) for the gases. The arrangement is such that the annular space (10), the capillary gaps (28), the vapor ducts (26), the condenser (8) and the return-flow orifice or orifices (19) are parts of a closed gas-circulation path.

5 Claims, 3 Drawing Figures

DISTILLATION AND SUBLIMATION APPARATUS COMPRISING A CONDENSER

The invention concerns a distillation and sublimation apparatus comprising: a receiving vessel; a plurality of containers for the starting product, which each have a bottom, an outer wall of constant height and an inner wall of smaller height forming a downwardly directed vapour duct, the containers being mounted one upon the other by their outer walls in such manner that the vapour ducts of all of the containers form a downwardly extending series arrangement and that an unoccupied annular space is present within the receiving vessel; a cover resting on the outer wall of the top container; and a condenser, into which the vapour duct of the bottom container discharges.

Such forms of apparatus are disclosed in DE-AS No. 15 58 410 and DE-AS No. 25 33 703. In these systems, too, the containers form a stack which is surrounded by an annular space. However, the interfaces between the containers are surrounded by a hollow cylindrical thermal insulation means, and this is in turn arranged within a metallic jacket which carries an induction coil, which serves to heat the containers. This external means enveloping the stack of containers constitutes an effective arrangement for sealing off the interfaces between the containers and it prevents flow of gas across the interfaces.

If metallic vapours escape from the known stacks of containers by way of any imperfectly sealed zones, these vapours inevitably condense on the inner walls of the receiving vessel. If the metals are of a corrosive kind, this leads, in the course of time, to destruction of, or at least damage to, the receiving vessel.

DE-AS No. 10 70 151 discloses a sublimation apparatus comprising a single container which is closed at the bottom and on which are mounted a plate, having inclined ducts, and several rings comprising channels in which non-volatile impurities are intended to be trapped. The stack of rings, which are open at the bottom is closed off at the top by a condensation plate. By means of specially arranged orifices 12, entry of fluoride vapours into the annular space between the stack and the container jacket is promoted, so that the jacket is also made of stainless steel so as to resist corrosion by the fluorides that would otherwise inevitably occur. However, the use of high-grade steel is in no way adequate for dealing with many corrosive metals, including zinc.

The formation of a gas-circulating path that could prevent condensation of fluoride on the outer jacket is not possible with the known apparatus.

DE-OS No. 14 44 328 discloses apparatus for concentrating fluids or solutions, in which apparatus the free atmosphere is drawn into a gas-circulating path. This apparatus is unsuitable for the handling of substances that would be entrained by the circulating air at a high partial pressure, since this would lead to considerable contamination of the surrounding area.

In the apparatus of DE-AS No. 15 58 410 and of DE-AS No. 25 33 710, there is even provided, at points outside the stack of containers, i.e. in the zone of the means for supplying the molten material, a screening connection which is located between the molten material and the inner surfaces or components of the receiving vessel. Consequently, it is impossible to prevent the components that are to be evaporated from condensing, at least in part on these components or inner surfaces of the receiving vessel. These quantities of condensate are not only lost because of the amounts of material deposited in the condenser itself, but they also constitute an undesirable contamination of the receiving vessel and its components.

Of very special importance in this connection is the tendency of certain condensates to react in an undesirable manner with the condensation surfaces or to form alloys therewith that finally lead to the destruction of the components concerned. A particularly dangerous example of such condensates is zinc, which attacks metallic parts, in particular steel parts, on a considerable scale and forms an alloy with them.

In hot-galvanizing, use is made of that property of zinc whereby its contact surface acquires a uniform serrated formation. Whereas the very great adhesion strength of the zinc coating is very much to be desired in end products produced in this way, the almost unbreakable bond between the zinc and the condensation surface would represent an undesirable result when, for example, the wall of the receiving vessel had to be cleansed of the condensed zinc at areas spaced from each other at certain distances. This is a problem that cannot be solved in practice.

The object of the present invention is, therefore, to provide apparatus of the initially described kind wherein the vaporized components of molten material are deposited almost totally in the condenser, and in which, in particular, no vapours (metallic vapours) are deposited on the inner surfaces or components of the receiving vessel.

According to the invention and in the case of the initially defined apparatus, this object is achieved in that capillary gaps, open towards the annular space in the receiving vessel, are present between the containers and between the top container and the cover, and in that the condenser communicates with the annular space by way of at least one return-flow opening for gases, the arrangement being such that the annular space, the capillary gaps, the vapour ducts, the condenser and the return-flow opening or openings are parts of a closed gas-circulation path.

By means of the arrangement of the capillary gaps, in accordance with the invention, which gaps, together with the return-flow orifice located at another point, constitute the only connection between the annular space and the material (melt) that is to be handled, the screen connection between the material and the inner surfaces and components of the receiving vessel is interrupted. The apparatus usually contains an inert-gas atmosphere which, depending upon the vapour pressure of the material to be vaporized or depending upon how the process is carried out, may lie between 2000 mbars and $10^{-2}$ mbars. The usual distillation and sublimation processes are greatly facilitated by the use of a vacuum.

The inert gas can then pass in adequate amounts to the interior of the containers by way of the capillary gaps. Because of the pressure-dependent and temperature-dependent distillation process to which the molten material is subjected, flow of vapour through the vapour ducts is initiated, and this flow is intensified from one vapour duct to another by each fresh input of vapour. Although, as regards flow, the vapour ducts are arranged in series, the flow of vapour from the individual containers proceeds in parallel, since in each case vapour is introduced over the upper edge of the inner wall which, for this purpose, has a smaller height. Thus, there flows through each vapour duct a quantity of vapour which corresponds to the sum of the quantities of vapour from the overlying containers plus the quantity of vapour from that container in which the vapour duct, just considered, is disposed. In other words, the total quantity of all the vapours released in the apparatus flows through the bottom vapour duct.

The vapour concerned then has a certain partial pressure in the inert gas which is contained within the receiving vessel. This partial pressure of the condensable vapour diminishes very considerably when the stream enters the condenser. Among other things, the mechanics of the movement of metallic vapour is maintained by the drop in partial pressure. On the other hand, however, the inert gas is entrained by the movement of the vapour and it cannot condense in the condenser, but it flows back by way of the return-flow orifice or orifices into the annular space between the stack of containers and the wall of the receiving vessel. This effect can be compared with the mechanics of a diffusion pump. Since the inert gas escapes again from the condenser and, through the return-flow orifices, re-enters the receiving vessel in the vicinity of the stack of containers, renewed flow through the said capillary gaps takes place, i.e. the inert gas is moved along a circulatory path by the action of the stream of metallic vapour without the use of mechanical means such as circulating pumps, for example. This "inward" flow of inert gas through the capillary gap prevents the flow of metallic vapours in the opposite direction.

Regarding the amounts of gas that flow through each of the vapour ducts, the same considerations apply as for the metallic vapours: the sum of all the quantities of gas that enter the capillary gaps disposed above each vapour duct flows through this duct. Thus, the sum of the gases entering through all of the capillary gaps passes through the bottom vapour duct. The flow cross-sections of the capillary gaps are arranged in parallel, whereas as previously stated, the vapour ducts are arranged in series. Velocity of flow or quantities of gas per unit of time on the one hand and steam on the other vary roughly proportionally, i.e. the relative partial pressures of gas and vapour do not change along the path of downward flow through the vapour ducts, assuming, on the one hand, similar flow cross-sections in the capillary gaps and, on the other hand, equal quantities of released vapour in each of the containers.

In this manner and when use is made of six containers therefore involving six capillary gaps, the effect of a six-times greater flow of material through the bottom vapour duct is achieved, and this is accompanied by a corresponding rise in the velocity of flow. Related to a pressure of, for example, 10 mbars, it is readily possible to achieve the velocity of sound in the bottom vapour ducts and at the entry to the condenser, so that the stream expands laterally. This results in the additional effect that the condensing metal is deposited in the lateral direction on the walls of the condenser and not—as occurs with slow flow and Gaussian distribution—at the bottom and in the middle of the condenser in the form of a cone which increases in size towards the bottom vapour duct and would gradually block the latter. This effect is made possible by the high cumulative velocity of flow of the vapour and gas, so that the service life of the apparatus up to the point at which the condenser is emptied is considerably lengthened.

Since, by means of an expedient form of condenser, it is readily possible to condense the metallic vapours in such quantities that the inert gas is completely free from metallic vapour when it enters the receiving vessel, entry of metallic vapours towards the inner faces and components of the receiving vessel is easily prevented in this way. The inert gas acts, to some extent, as a medium for flushing the space between each container and the wall of the receiving vessel, and it results in the apparatus having an extra-ordinarily lengthy service life.

Figure 3:
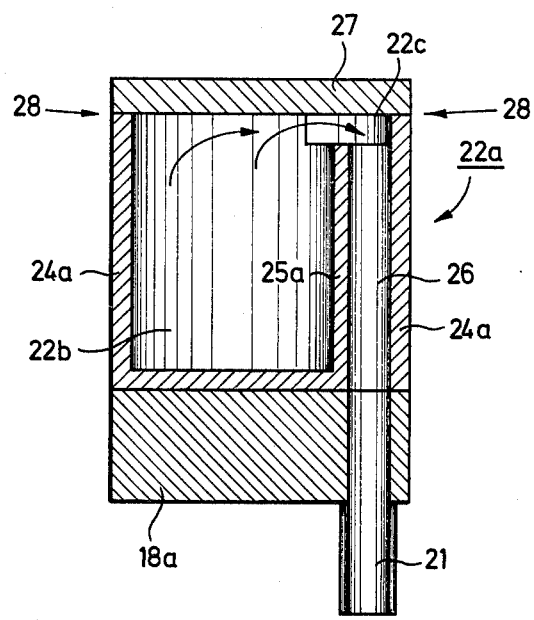
Figure 2:
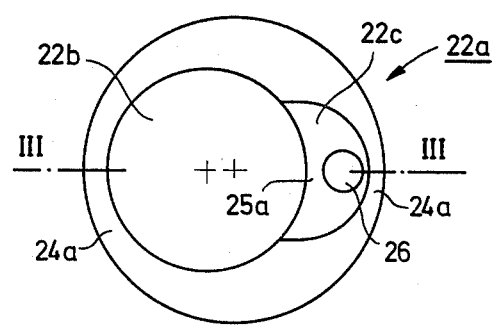

Further advantageous forms of the subject-matter of the invention are set forth in the other subsidiary claims. An embodiment of the invention will now be described in greater detail by reference to the accompanying drawings, in which:

FIG. 1 shows a vertical section through a complete apparatus with the necessary peripheral means, including a regulating system, FIG. 2 is a plan view of a container with the vapour duct arranged off-centre, and FIG. 3 is a vertical section through the FIG. 2 subject-matter, along the line III—III.

Shown in FIG. 1 is a base plate 1, on which rests a receiving vessel 3, a seal 2 being interposed between the plate and the vessel. The receiving vessel is in the form of a hollow cylinder open at the bottom. The base plate 1 has an opening 4 which is disposed coaxially with the receiving vessel and below which is connected a port 5 with a flange 6.

Connected to the flange 6 by way of a seal 7 is a condenser 8, which consists of a hollow cylindrical pot with a cooling coil 9 fitted on its exterior. The inner cross-sections of the port 5 and the condenser 8 are roughly equal to each other.

The receiving vessel 3 encloses an annular space 10, whereas the condenser 8 encloses a condensation space 11. The two said spaces communicate with each other, but form a unit which is closed off from the exterior.

The receiving vessel 3 is surrounded by a coaxial thermal hood 12, which is supported at its lower end on the annular flange, not detailed, of the receiving vessel 3, a seal 13 being fitted between said hood and annular flange. A gas-tight chamber 14 is formed between the hood and the receiving vessel. The thermal hood 12 is lined with a thermal insulation means 15, within which is arranged a heating means which is symbolized by the heating element 16. The heating capacity can be varied by means of a power regulator 17.

Located in the lower part of the receiving vessel 3 is a support member 18, which is formed by a body of rotation and which is mounted on the base plate 1 in such a way that the cross-section of the opening 4 is not completely closed off. This is achieved by means of several return-flow orifices 19 located at the outer lower edge of the support member 18, which orifices form radial recesses and leave uncovered cross-sections that suffice to form a circulatory path for the inert gas. The support member 18 encloses a substantially funnel-shaped space 20, the lower end of which adjoins a coaxial vapour-conducting means 21.

Resting on the support member 18, which for this purpose has a circular rim, is a stack of containers 22, all of which have the same outside diameter as the support member 18. Each container has a bottom 23, an outer wall 24 of constant height and an inner wall 25 which surrounds a vapour duct 26. The bottom 23 of each container is flat and the inner wall 25 is in each case lower than the outer wall 24, so that a radial gap is created that is of sufficient size in the vertical direction to permit the developing flow of vapour. All of the containers are designed as bodies of rotation, so that all of the vapour ducts 26 are aligned with each other and with the vapour-conducting means 21. The top container 22 is closed off by a cover 27 which also overlies the vapour duct.

The support member 18, the containers 22 and the cover 27 are made of a material, for example graphite, resistant to attack by the processed materials. By means of the described stacked arrangement of the containers 22, what are known as capilliary gaps 28 are formed between the contact surfaces, which are of annular shape, and these capilliary gaps, although permitting inward flow of inert gas through the cylindrical enveloping surfaces of all the containers, does not however permit flow of vapour in the opposite direction.

It will be seen that the vapour-conducting means 21 discharges into the condenser 8. The surface of the solid condensate deposited in the condenser is indicated by the broken line 29. During operation of the apparatus, the starting material is in the fused and/or solid condition and is located in the annular spaces between the outer walls 24 and the inner walls 25. Because of the above-described flow and partial pressures, there is created effective circulatory flow of the non-condensable inert gas, which accompanies the metallic vapour into the condenser, but which leaves the condensation chamber again, free of metallic vapour components, by way of the return-flow orifices 19 and enters the annular gap between the receiving vessel 3 and the containers 22. From here, the inert gas again passes into the interiors of the containers through the described capilliary gaps, so that the cycle is repeated.

The required operating pressure in the receiving vessel 3 is set up in the vacuum zone by a suction port 30, which communicates with a vacuum pump 36 by way of a pipe 31, incorporating a pressure gauge 32, and by way of a pipe 33, a filter 34 and a valve 35.

For the purpose of relaxing the pressure in the receiving vessel 3, pressures of roughly equal magnitude can be set up in the heating chamber 11 as well as in the gas-tight chamber 14. This is achieved by providing the thermal hood 12 with a port 37 from which a pipe 38 extends, by way of a valve 39, to a second vacuum pump 40. The suction sides of the vacuum pumps 36 and 40 are interconnected by way of a pipe 41 in which is provided a non-return valve 42.

Fitted in the gas-tight chamber 14 is a temperature sensor 43, which, by way of a temperature-limiting means 44 and a control pipe 45, acts on the setting member 17 to effect limitation of temperature.

Provided within the receiving vessel 3 and immediately adjacent the containers 22 is a further temperature sensor 46 which, by way of a reversing switch 47, acts, as required, either on the setting member 14 or on a pressure regulator 48. It is thus possible to regulate the temperature of the molten material independently of pressure, since small changes in temperature cause very great changes in the vapour pressure. However, the vaporization rate is proportional to the quantity of heat applied. If the temperature of the molten material or of the containers is then determined by means of the temperature sensor 46 then by regulating pressure it is possible to ensure that the pressure does not drop to such an extent that the molten material "freezes" in the containers 22. The temperature in the containers can be kept substantially constant.

FIGS. 2 and 3 illustrate the off-centre arrangement of the vapour-conducting means 21 and the vapour channel 26 on the support member 18a, i.e. in the container 22a. The outer wall 24a and the inner wall 25a merge with each other, and a cylindrical space 22b, instead of an annular space, is provided for receiving the starting material. Also, the inner wall 25a is shortened so as to create a flow path for the vapour (in the direction indicated by the arrows). This is achieved by milling out a pocket 24c, which has a crescent-shaped configuration in plan view. Particularly when mounted on a pivot, not illustrated, a container of this kind can be more easily emptied, by tilting, than can the containers, comprising annular channels, illustrated in FIG. 1.

In other respects the provision of a capillary gap 28 between the upper flat delimiting surface of the outer wall 24a and the cover 27 is achieved in precisely the same way as previously.

FIG. 3 shows just one container 22a. It will however be understood that a number of these containers are stacked one upon the other as shown in FIG. 1.

The expression "capillary gap" will be understood as meaning a gap-like space between an outer wall and the edge of the cover; such capillary gap is, for example, bounded by flat annular surfaces, one on the container and one on the cover when the cover rests on the edge of the container by way of the usual surface irregularities (score-lines resulting from machining). The same applies as regards the capillary gap formed between two containers. The capillary gap can be also increased in length by a screwthread, a labyrinth or the like. The width of the gap should not be more than approximately 0.1 mm. The limiting value can be determined by tests; it is reached when metal condenses on the walls of the receiving vessel.

The number of containers is not particularly critical. A minimum of as few as two containers suffices. However, the effect increases with the number of capillary gaps, so that either the number of gaps for each container has to be increased, and/or it is generally necessary to increase the number of containers so that the vaporization area is also increased.

We claim:

1. A distillation and sublimation apparatus comprising: a receiving vessel; a plurality of containers for the starting product, which each have a bottom, an outer wall of constant height and an inner wall of smaller height forming a downwardly directed vapour duct, the containers being mounted one upon the other by their outer walls in such manner that the vapour ducts of all of the containers form a downwardly extending series arrangement and that an unoccupied annular space is present within the receiving vessel; a cover resting on the outer wall of the top container; and a condenser into which the vapour duct of the bottom container discharges, characterized in that capillary gaps (28), open towards the annular space (10) in the receiving vessel (3) are present between the container (22) and between the top container and the cover (27), and in that the condenser (8) communicates with the annular space (10) by way of at least one return-flow opening (19) for gases, the arrangement being such that the annular space (10), the capillary gaps (28) the vapour ducts (26), the condenser (8) and the return-flow opening or openings (19) are parts of a closed gas-circulation path.

2. A distillation and sublimation apparatus according to claim 1, characterized in that the containers (22) are stacked upon each other by means of their outer walls (24) in such manner that the vapour ducts (26) are aligned with each other.

3. A distillation and sublimation apparatus according to claim 1, characterized in that the bottom container (22) is mounted on a support member (18) which is arranged in the receiving vessel (3) and has a vapour conducting means (21), aligned with the vapour ducts (26) and leading into the condenser (8), and has at least one return-flow opening (19) at its periphery.

4. A distillation and sublimation apparatus according to claim 1, characterized in that the containers (22) are formed as bodies of rotation.

5. A distillation and sublimation apparatus according to claim 1, characterized in that the vapour duct (26) is arranged off-centre.

* * * * *